United States Patent
Cherney et al.

(10) Patent No.: US 12,376,528 B2
(45) Date of Patent: Aug. 5, 2025

(54) SQUARE BALER NEEDLE LOCKOUT DEVICE

(71) Applicant: AGCO Corporation, Duluth, GA (US)

(72) Inventors: Patrick L Cherney, Hesston, KS (US); Kelly B. Booton, Lehigh, KS (US)

(73) Assignee: AGCO Corporation, Duluth, GA (US)

( * ) Notice: Subject to any disclaimer, the term of this patent is extended or adjusted under 35 U.S.C. 154(b) by 625 days.

(21) Appl. No.: 17/758,079

(22) PCT Filed: Oct. 8, 2020

(86) PCT No.: PCT/IB2020/059460
§ 371 (c)(1),
(2) Date: Jun. 28, 2022

(87) PCT Pub. No.: WO2021/136989
PCT Pub. Date: Jul. 8, 2021

(65) Prior Publication Data
US 2023/0031888 A1 Feb. 2, 2023

Related U.S. Application Data

(60) Provisional application No. 62/955,127, filed on Dec. 30, 2019.

(51) Int. Cl.
*A01F 15/14* (2006.01)
(52) U.S. Cl.
CPC .................................. *A01F 15/145* (2013.01)
(58) Field of Classification Search
CPC .... A01F 15/145; A01F 15/14; A01F 15/0858; A01F 15/0866
See application file for complete search history.

(56) References Cited

U.S. PATENT DOCUMENTS

| 4,503,762 A | 3/1985 | Naaktgeboren |
| 4,815,372 A | 3/1989 | Dekeyser et al. |

(Continued)

FOREIGN PATENT DOCUMENTS

| DE | 594733 C | 3/1934 |
| GB | 1162744 A | 8/1969 |

(Continued)

OTHER PUBLICATIONS

UK Intellectual Property Office, Search report for related UK Application No. GB200041 1.5, dated Jul. 9, 2020.

(Continued)

*Primary Examiner* — Mohammed S. Alawadi (57) ABSTRACT

A bale binding mechanism is configured to wrap twine around a bale. The bale binding mechanism broadly includes a baling needle, a drive shaft, a clutch, and a trip mechanism. A baler chassis presents a baling chamber in which the bale is formed. The baling needle is shiftable relative to the baling chamber to advance twine along an end of the bale. The drive shaft is supported by the chassis to power the needle. The clutch is shiftable between an engaged condition in which the clutch drivingly interconnects the drive shaft and the needle, and a disengaged condition in which the clutch prevents the drive shaft from driving the needle. The trip mechanism includes a trip cam, drive wheel, and a lockout device. The trip cam is shiftable between a trip condition associated with engagement of the clutch and a metering condition associated with disengagement of the clutch. The drive wheel is operable to shift the trip cam when in the metering condition. The trip cam is shiftable from the metering condition to the trip condition to engage the clutch when the bale is formed to a desired size. The lockout device removably engages the trip cam to restrict the metering cam from shifting into the trip condition.

13 Claims, 6 Drawing Sheets

(56) References Cited

U.S. PATENT DOCUMENTS

| | | | |
|---|---|---|---|
| 5,058,495 A * | 10/1991 | Van Den Bossche | ........................ A01F 15/0858 56/343 |
| 5,937,746 A | 8/1999 | Jonckheere et al. | |
| 6,318,250 B1 * | 11/2001 | Arnould | .............. A01F 15/0858 56/343 |
| 2002/0066375 A1 | 6/2002 | Honhold | |
| 2017/0006780 A1 | 1/2017 | De Gersem et al. | |
| 2020/0084972 A1 * | 3/2020 | Naeyaert | ................ A01F 15/145 |

FOREIGN PATENT DOCUMENTS

| | | | |
|---|---|---|---|
| GB | 1522071 A | 8/1978 | |
| GB | 2326126 A1 | 12/1998 | |

OTHER PUBLICATIONS

European Patent Office, International Search Report related to International Patent Application No. PCT/IB2020/059460 mail date Dec. 21, 2020.

* cited by examiner

SQUARE BALER NEEDLE LOCKOUT DEVICE

CROSS REFERENCE TO RELATED APPLICATION

This application claims the benefit of U.S. Provisional Application No. 62/955,127, filed Dec. 30, 2019, which is hereby incorporated by reference in its entirety.

BACKGROUND

Field

The present invention relates generally to agricultural baling equipment. More specifically, embodiments of the present invention concern a baler with a baling needle and a needle lockout operable to selectively restrict the baler from performing a bale tie cycle.

Discussion of Prior Art

Powered agricultural balers are commonly used to bind severed hay material and other severed crop material into bales for later use, such as feed for livestock. Square balers that use discrete lengths of twine (or other strands of binding material) to bind loose material into a bale generally include a needle assembly to wrap strands of twine around each formed bale and secure the twine. Prior art balers also generally include a trip mechanism to initiate a bale tie cycle during which the needle assembly is operated to wrap a bale. For maintenance purposes, square balers are normally provided with a lockout to restrict components of the baler, including the needles and knotter mechanism, from inadvertently performing a bale tie cycle.

Conventional balers with trip devices and lockout mechanisms have various problems and limitations. For instance, the trip devices and lockout mechanisms of prior art balers are known to experience substantial wear during use. Furthermore, these known trip devices and lockout mechanisms generally require frequent maintenance and adjustment for reliable operation.

This background discussion is intended to provide information related to the present invention which is not necessarily prior art.

SUMMARY

The following brief summary is provided to indicate the nature of the subject matter disclosed herein. While certain aspects of the present invention are described below, the summary is not intended to limit the scope of the present invention.

Embodiments of the present invention provide a baler that does not suffer from the problems and limitations of the prior art devices set forth above.

One aspect of the present invention concerns a bale binding mechanism configured to wrap twine around a bale. The bale binding mechanism broadly includes a baling needle, a drive shaft, a clutch, and a trip mechanism. A baler chassis presents a baling chamber in which the bale is formed. The baling needle is shiftable relative to the baling chamber to advance twine along an end of the bale. The drive shaft is supported by the chassis to power the needle. The clutch is shiftable between an engaged condition in which the clutch drivingly interconnects the drive shaft and the needle, and a disengaged condition in which the clutch prevents the drive shaft from driving the needle. The trip mechanism includes a trip cam, drive wheel, and a lockout device. The trip cam is shiftable between a trip condition associated with engagement of the clutch and a metering condition associated with disengagement of the clutch. The drive wheel is operable to shift the trip cam when in the metering condition. The trip cam is shiftable from the metering condition to the trip condition to engage the clutch when the bale is formed to a desired size. The lockout device removably engages the trip cam to restrict the metering cam from shifting into the trip condition.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Preferred embodiments of the invention are described in detail below with reference to the attached drawing figures, wherein.

The drawing figures do not limit the present invention to the specific embodiments disclosed and described herein. While the drawings do not necessarily provide exact dimensions or tolerances for the illustrated components or structures, the drawings, not including any purely schematic drawings, are to scale with respect to the relationships between the components of the structures illustrated therein.

DETAILED DESCRIPTION OF THE PREFERRED EMBODIMENTS

Figure 1:
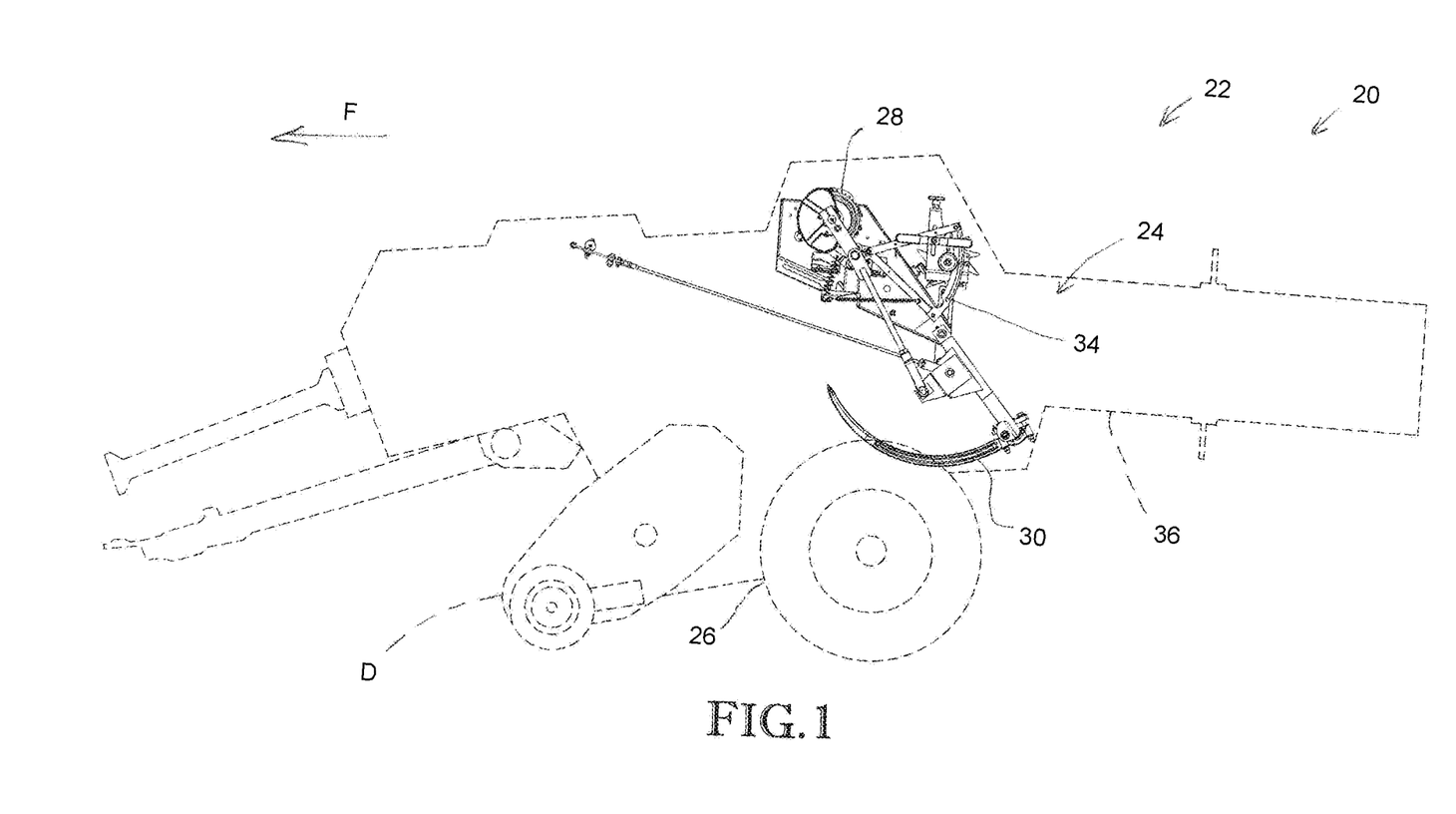
FIG. 1 is a fragmentary side elevation of a baler constructed in accordance with a preferred embodiment of the present invention, with the baler including a chassis and a bale binding mechanism that includes a knotter mechanism, needle assembly, and trip mechanism.
Figure 2:
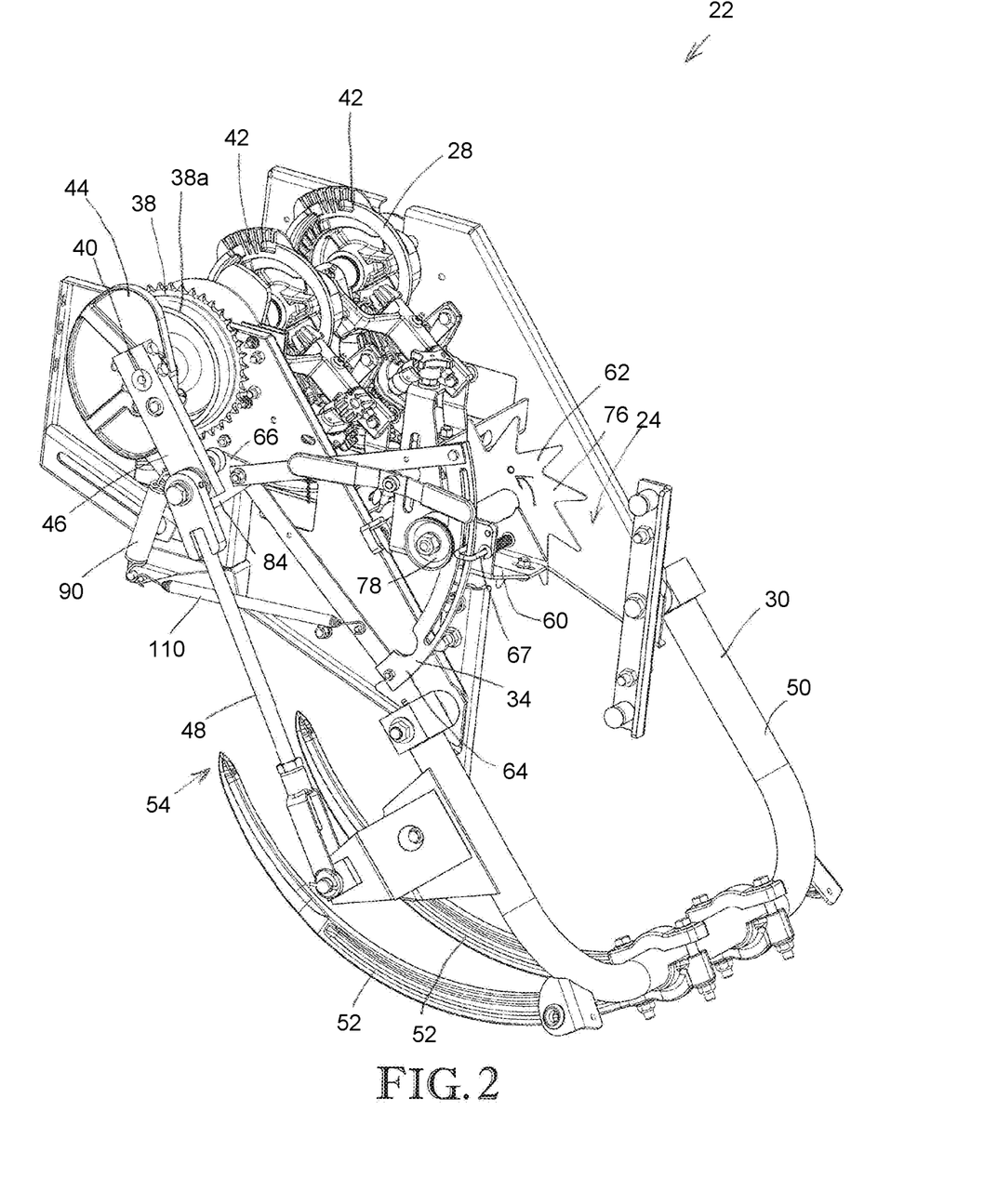
FIG. 2 is a fragmentary perspective of the chassis and bale binding mechanism shown in FIG. 1, depicting the knotter mechanism, needle assembly, and trip mechanism operably supported by the chassis, with the trip mechanism in a metering condition.

Turning to FIGS. 1 and 2, an agricultural baler 20 is configured to collect severed crop material (not shown) from a field and form a series of bales (not shown) from the severed crop material. The baler 20 preferably includes a bale binding mechanism 22 configured to secure strands of binding material (not shown), such as twine, around a bale of severed crop material.

Preferably, the bale binding mechanism 22 is provided as part of the baler 20, which can be advanced along a field to collect severed crop material. In the usual manner, the baler 20 is generally towed by a powered tractor (not shown), or other self-powered vehicle, so as to be advanced in a forward direction F along a windrow of severed crop material. As the baler 20 is advanced, a baler pickup device D of the baler 20 collects the windrow and directs the windrow material into a baling chamber 24 defined at least in part by a baler chassis 26.

Figure 3:
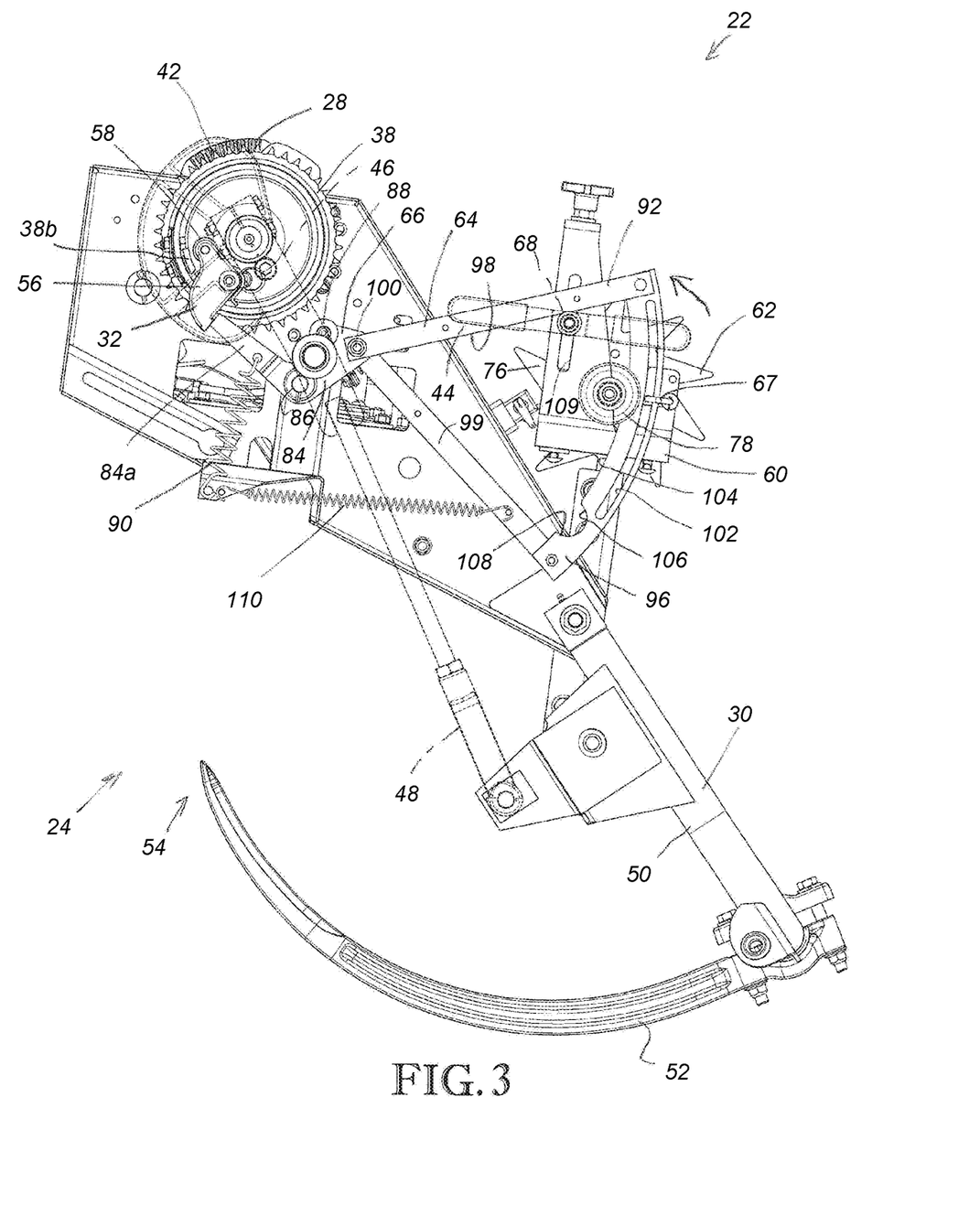
FIG. 3 is a side elevation of the chassis and bale binding mechanism shown in FIG. 2, showing a trip cam, trip arm, drive, bale size adjuster, and lockout device of the trip mechanism, and further depicting the trip arm contacting the clutch so that the clutch is disengaged.

The bale binding mechanism 22 preferably includes a knotter mechanism 28, a needle assembly 30, a clutch 32, and a trip mechanism 34 (see FIGS. 1-3). As will be described further, the trip mechanism 34 preferably provides a lockout condition in which the baler 20 is restricted from performing a bale tie cycle (e.g., to facilitate baler maintenance).

The baler chassis 26 is configured to support the baler pickup device D, the bale binding mechanism 22, and other operating components. The baler chassis 26 includes, among other things, a baler frame 36 that presents the baling chamber 24. The baler frame 36 is preferably conventional and includes a series of fore-and-aft extending frame members (not shown) that at least partly define the baling chamber 24 and direct severed crop material through the baling chamber 24 as the material is formed into bales (not shown). In the illustrated embodiment, the baler frame 36 also operably supports the knotter mechanism 28, needle assembly 30, and trip mechanism 34.

As a bale is formed within the baling chamber 24, strands of twine (not shown) are extended and eventually secured around the bale. In the usual manner, bales are generally formed in a rearward direction and directed rearwardly out of the baler 20. The baling chamber 24 extends fore-and-aft to permit bales to be formed and advanced rearwardly.

Figure 4:
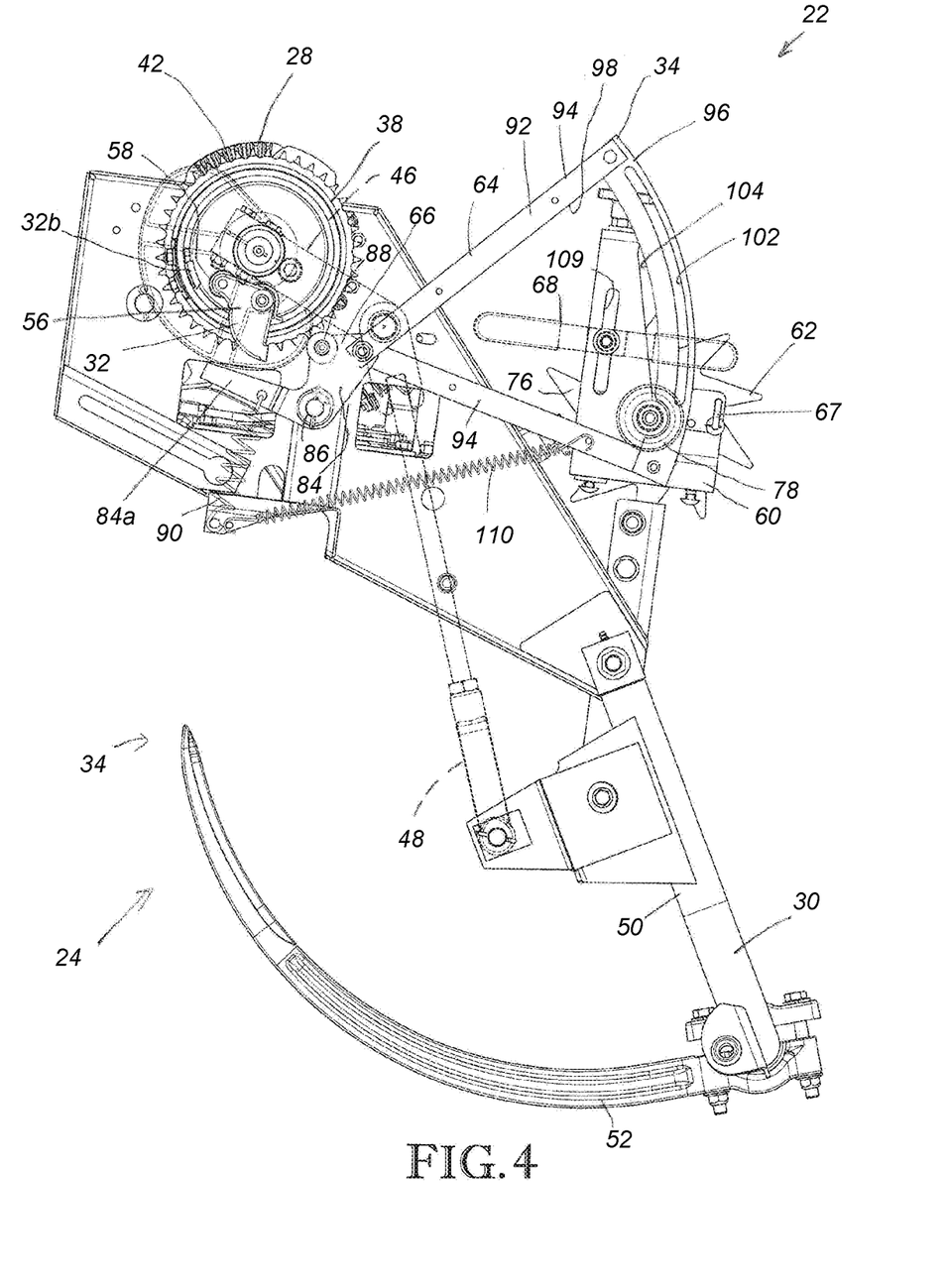
FIG. 4 is a side elevation of the chassis and bale binding mechanism similar to FIG. 3, but showing the trip mechanism shifted into a trip condition where the trip arm is shifted out of contact with the clutch.

Turning to FIGS. 2-4, the knotter mechanism 28 and needle assembly 30 are configured to be driven by a drive sprocket 38 for binding bales in the baling chamber 24. The drive sprocket 38 is powered by a chain drive (not shown) and includes a cylindrical skirt 38a (see FIG. 2) and a lobe 38b (see FIG. 3) operable to be engaged by the clutch 32.

In the usual manner, the knotter mechanism 28 includes a drive shaft 40 and multiple knotter head assemblies 42 (see FIG. 2). The knotter head assemblies 42 are powered by the drive shaft 40 and cooperate with the needle assembly 30 to form at least one knot in respective strands of twine during a bale tie cycle. The drive sprocket 38 is journaled on the drive shaft 40 and is configured to spin relative to the drive shaft 40 when the baler 20 is not performing a bale tie cycle.

The illustrated needle assembly 30 includes a cam wheel 44, crank arm 46, rod 48, needle frame 50, and needles 52. The cam wheel 44 and the crank arm 46 are attached to and rotate with the drive shaft 40 of the knotter mechanism 28. In particular, the cam wheel 44 and crank arm 46 are each configured to rotate a single revolution with the drive shaft 40 during a bale tie cycle. As described below, the bale tie cycle is initiated when the clutch 32 is engaged.

Figure 6:
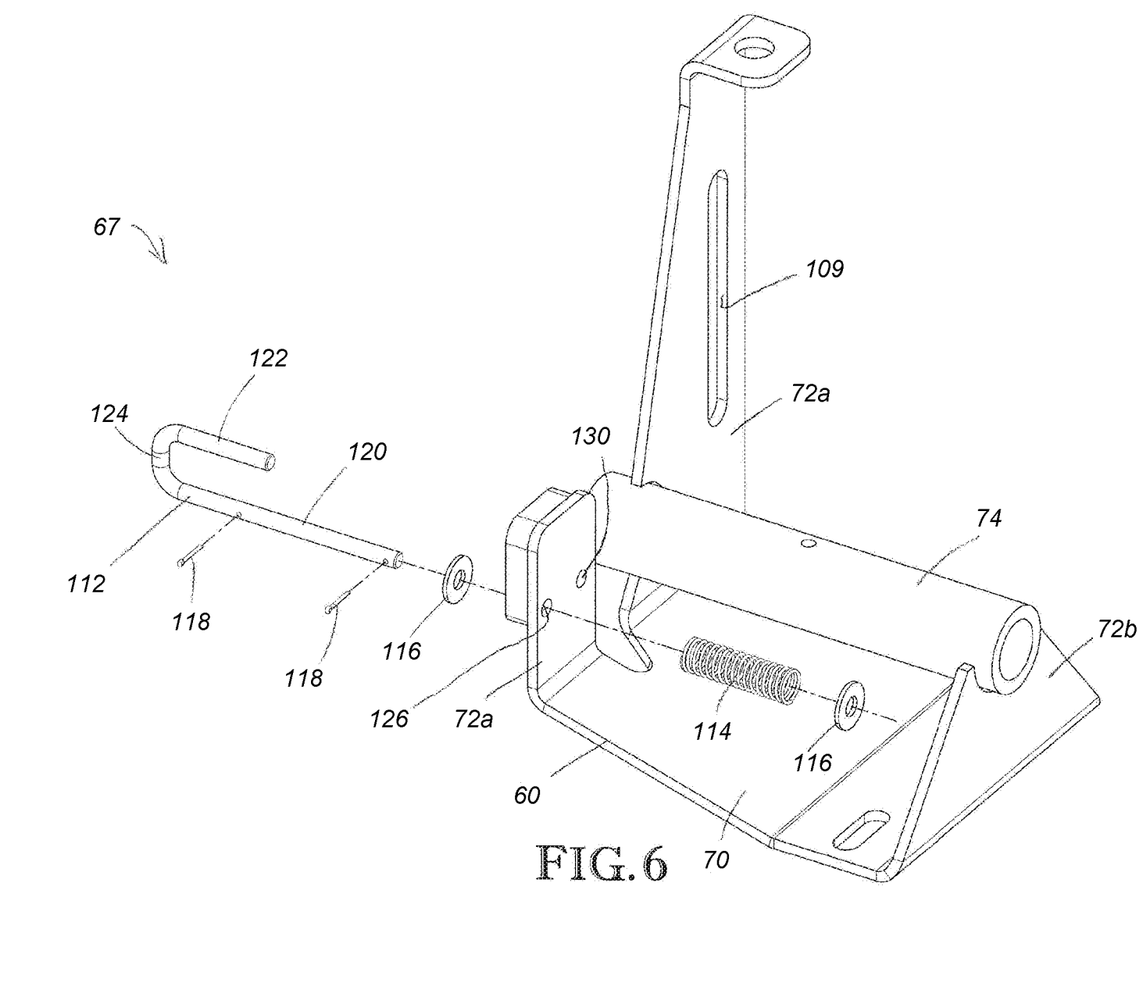
FIG. 6 is a fragmentary perspective of the trip mechanism shown in FIGS. 1-5, showing the support and the lockout device exploded from the support.

The needles 52 are mounted on the needle frame 50 and are each associated with a respective strand of twine (see FIG. 6). Each needle 52 is configured to advance twine vertically along an end of the bale (see FIG. 6). The needle 52 presents a distal needle end 54 that receives and supports the twine during operation.

The needles 52 are shiftable relative to the baling chamber 24 during a bale tie cycle to bind a bale. In the depicted embodiment, the needles 52 are shiftable upwardly into the baling chamber 24 during an advancement stroke of the bale tie cycle to advance strands of twine upwardly along an end of the bale. The needles 52 position the strands of twine so that the knotter mechanism 28 can secure the twine around the bale. The needles 52 are also shiftable downwardly out of the baling chamber 24 during a return stroke of the bale tie cycle to permit formation of the next bale.

Although the illustrated embodiment references upward and downward directions associated with the needles 52 and other baler components, it will be appreciated that at least some aspects the present invention broadly cover alternative orientations and movements of the baler components. For instance, it is within the scope of at least some aspects of the present invention for the needle assembly to be alternatively positioned relative to the baling chamber (e.g., above the chamber).

Turning to FIGS. 3 and 4, the clutch 32 is operable to initiate a bale tie cycle and transmit driving power from the drive shaft 40 to the needle assembly 30. The depicted clutch 32 includes a clutch body 56 and a roller 58 that is rotatably supported by the clutch body 56. The clutch body 56 is pivotally mounted relative to the cam wheel 44. This pivotal mounting permits rotation of the clutch 32 between an engaged condition (not shown), in which the clutch 32 drivingly interconnects the drive shaft 40 and the needle assembly 30, and a disengaged condition (see FIGS. 3 and 4), in which the clutch 32 prevents the drive shaft 40 from driving the needle assembly 30.

In the engaged condition (not shown), the roller 58 is shifted into engagement with the skirt 38a to contact the lobe 38b. With the roller 58 and lobe 38b engaged with each other, the clutch 32 is configured to transmit driving torque from the sprocket 38 to the cam wheel 44. In turn, the driving torque is transmitted to the knotter mechanism 28 and the needle assembly 30 for performing a bale tie cycle.

In the disengaged condition, the clutch 32 is rotated from the engaged condition so that the roller 58 is spaced radially inwardly from the skirt 38a (see FIGS. 3 and 4). With the clutch 32 disengaged, the clutch 32 permits the drive sprocket 38 to spin freely relative to the drive shaft 40.

Turning to FIGS. 2-6, the trip mechanism 34 is operable to control the size of the bale produced by the bale binding mechanism 22. More specifically, the illustrated trip mechanism 34 is preferably adjustable so that the operator can set a desired bale length. The trip mechanism 34 preferably includes, among other things, a support 60, a drive 62, a trip cam 64, a trip arm 66, a lockout device 67, and a bale size adjuster 68 (see FIG. 5).

The depicted support 60 is configured to position various components of the trip mechanism 34 for trip mechanism operation. The support 60 includes a frame 70 with upstanding walls 72a, 72b and a sleeve 74 that interconnects the walls 72a, 72b.

As is customary, the drive 62 is operable to power the trip cam 64 for producing the desired bale length. The illustrated drive 62 preferably includes a powered star wheel 76, a drive wheel 78, and a shaft 80 that drivingly connects the wheels 76, 78 (see FIG. 5). The star wheel 76 is conventional and includes large teeth to engage the bale as the bale passes along the baling chamber 24.

The drive wheel 78 is operable to shift the trip cam 64 during baler operation. The drive wheel 78 preferably comprises a metering gear with a series of gear teeth 82. In the metering condition, the teeth 82 of the drive wheel 48 engage a toothed surface of the trip cam 64 (see FIG. 5). As a bale passes along the baling chamber 24, the star wheel 76 is rotated by the bale and causes the drive wheel 78 to rotate. As explained below, rotation of the drive wheel 78 produces corresponding upward movement of the trip cam 64.

The trip arm 66 is shiftable to cause engagement and disengagement of the clutch 32. As will be explained further, the trip arm 66 is shiftable with the trip cam 64 between a trip condition associated with engagement of the clutch 32 and a metering condition associated with disengagement of the clutch 32.

Figure 5:
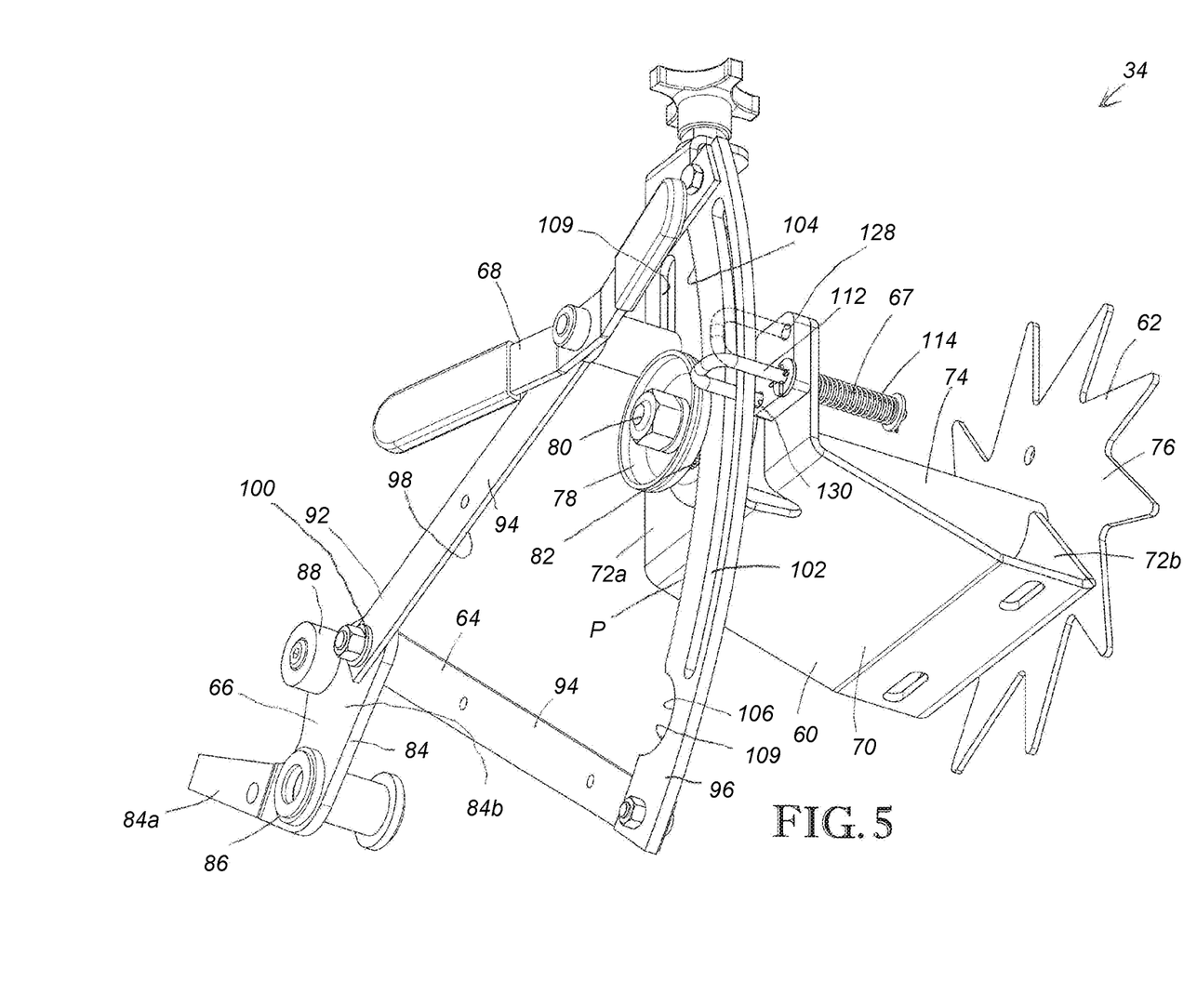
FIG. 5 is a perspective of the trip mechanism shown in FIGS. 1-4, showing the lockout device removably engaged with the trip cam, wherein a lockout pin of the lockout device extends through an elongated slot presented by the trip cam.

The trip arm 66 includes a unitary body 84 pivotally attached relative to the chassis 26 at a pivot joint 86, and a cam roller 88 rotatably supported by the body 84 (see FIG. 5). The body 84 includes arm segments 84a, 84b that extend away from the pivot joint 86 (see FIG. 5).

In the depicted embodiment, the arm segment 84a is operable as a pawl to removably contact the clutch 32 in a clutch contact position and hold the clutch 32 in the disengaged clutch condition (see FIG. 3). As noted above, the disengaged condition of the clutch 32 preferably corresponds to the metering condition of the trip arm 66.

The arm segment 84a is also shiftable out of contact with the clutch 32 (see FIG. 4) so that the clutch 32 is allowed to shift into the engaged clutch condition. Again, engagement of the clutch 32 preferably corresponds to the trip condition of the trip arm 66.

A spring 90 is attached to the trip arm 66 and urges the trip arm 66 out of the clutch contact position to permit disengagement of the clutch 32 (see FIG. 4). During the bale tie cycle, the trip arm 66 is returned to the clutch contact position by the cam wheel 44, which engages the cam roller 88 to pivot the trip arm 66 back to the clutch contact position.

As noted above, the trip cam 64 is shiftable between the trip condition associated with engagement of the clutch 32 and the metering condition associated with disengagement of the clutch 32. The trip cam 64 is preferably shiftable from the metering condition to the trip condition to engage the clutch 32 when the bale is formed to a predetermined size (e.g., a predetermined bale length).

In the illustrated embodiment, the trip cam 64 includes a cam frame 92 with a pair of legs 94 and a cam body 96 extending between ends of the legs 94 (see FIG. 5). The cam frame 92 and cam body 96 cooperatively form an opening 98 that operably receives the drive wheel 78. The legs 94 of the cam frame 92 are pivotally attached to the arm segment 84b at a pivot joint 100 (see FIGS. 3 and 5). For at least some aspects of the present invention, the cam frame could be alternatively constructed and/or positioned for supporting the cam body.

In the depicted embodiment, the cam body 96 preferably presents a slotted opening 102, in the form of a curved, elongated slot, to removably receive the lockout device 67. The cam body 96 also presents a driven edge surface 104 extending along the slotted opening 102. The driven edge surface 104 preferably comprises a toothed surface that is curved and defines a curved path P (see FIG. 5). The trip cam 64 is operable to be driven by the drive wheel 78 to travel along the curved path P while in the metering condition. In particular, the drive wheel 78 engages the driven edge surface 104 in the metering condition, such that rotation of the drive wheel 78 causes the cam body 96 to swing along and the driven surface 104 to advance along the path P.

The cam body 96 further presents an offset surface 106 that is at least partly offset from the driven surface 104 along the transverse direction and spaced from the driven surface 104 along the path P (see FIG. 5). The offset surface 106 defines a relief opening 108 that at least partly receives the drive wheel 78 in the trip condition (see FIG. 5). The relief opening 108 is preferably positioned so as to be spaced from the slotted opening 102.

For at least some aspects of the present invention, the cam body could be alternatively configured to facilitate trip mechanism operation. For instance, the cam body could present an alternative opening for engagement with the lockout device (e.g., a single opening having a complemental shape to the lockout device to snugly receive the device or a portion of the device (such as a circular opening receiving a similarly shaped pin)). Yet further, it is within of the scope of some aspects of the present invention for the trip cam to include another type of connection device for providing a suitable connection with the lockout device.

Alternative embodiments of the cam body may also include an alternative relief opening for cooperating with the drive wheel to provide the trip condition. In still other embodiments, consistent with some aspects of the present invention, the trip cam could have structure other than the depicted relief opening so that the trip cam facilitates the trip condition.

During use, the driven surface 104 of the trip cam 64 is preferably engaged by the drive wheel 78 in the metering condition to drive the trip cam 64 from a starting position (see FIGS. 2 and 3) toward the relief opening 108. The drive wheel 78 is driven by the star wheel 76 as the star wheel 76 is spun (see FIG. 2) by a bale advancing along the baling chamber 24. Rotation of the drive wheel 78 produces corresponding upward movement of the trip cam 64.

The starting position of the trip cam 64 is preferably set by the bale size adjuster 68. The adjuster 68 is removably inserted through a slot 109 for attachment to the upstanding wall 72a. The depicted adjuster 68 is preferably vertically adjustable along the slot 109 to change the location of the starting position along the upstanding wall 72a.

The adjuster 68 is preferably located in a relatively lower starting position along the slot 109 to produce a relatively longer bale length. Conversely, the adjuster 68 is preferably located in a relatively higher starting position along the slot 109 to produce a relatively shorter bale length.

During use, the drive wheel 78 is disengaged from the driven surface 104 when the trip cam 64 shifts from the metering condition to the trip condition. The trip cam 64 is shiftable in a direction transverse to the path P when shifting between the metering condition and the trip condition. For instance, when the trip cam 64 shifts to the trip condition so that the drive wheel 78 is received by the relief opening 108, the trip cam 64 moves in a forward direction relative to the baler chassis 26. As noted above, with the trip cam 64 shifted to the trip condition, the trip arm 66 is moved out of contact with the clutch 32 and permits engagement of the clutch 32 to start a bale tie cycle.

As the bale tie cycle is performed, the cam wheel 44 moves the trip arm 66 back to the clutch contact position. Such movement of the trip arm 66 shifts the trip cam 64 along the transverse direction so that the trip cam 64 can return to the metering condition. Preferably, the trip cam 64 is shifted rearwardly to permit the drive wheel 78 to be moved out of the relief opening 108 and into a position along the driven surface 104. Preferably, a spring 110 urges the trip cam 64 to return along the path P to the starting position associated with the metering condition.

The lockout device 67 is preferably configured for selectively restricting the baler 20 from performing a bale tie cycle. When the lockout device 67 is engaged with the trip cam 64 in the lockout condition, the lockout device 67 and the trip cam 64 cooperatively restrict the trip mechanism 34 from shifting into the trip condition. That is, in the lockout condition, the lockout device 67 and trip mechanism 34 cooperatively restrict the baler 20 from inadvertently performing a bale tie cycle (e.g., to facilitate baler maintenance).

The illustrated lockout device 67 is preferably spring-loaded and includes a lockout pin 112, a spring 114, washers 116, and cotter pins 118 (see FIG. 6). The lockout pin 112 includes opposite pin sections 120, 122 joined by a bight 124 (see FIG. 6). The pin section 120 is preferably slidably received by an opening 126 in the support 60. The spring 114 is received on the pin section 120 between and endmost washer 116 and the upstanding wall 72a. The spring 114 preferably urges the pin section 122 toward the upstanding wall 72a.

It is within the ambit of the present invention for the lockout device to be alternatively constructed for selective engagement with the trip cam. In alternative embodiments, the lockout device could include an alternative structure for insertion into the cam body. An alternative lockout device may also include a connection structure that engages the cam body (or another part of the trip cam) without being inserted into or through the trip cam. It is also within the scope of at least some aspects of the present invention for the lockout device to be alternatively shiftably supported relative to the trip cam 64, or include multiple components (e.g., pin sections) configured to engage the trip cam.

The lockout pin 112 is operable to be removably secured in an engaged position associated with engagement with the trip cam 64, and a disengaged position, in which the lockout pin 112 is disengaged from the trip cam 64.

In the disengaged position, the lockout pin 112 is preferably spaced from the trip cam 64. Preferably, the pin section 122 of the lockout pin 112 is removably secured in an opening 128 in the upstanding wall 72a (see FIGS. 4 and 5). The spring 114 preferably urges the pin section 122 into the opening 128 when in the disengaged position. However, the spring 114 also preferably permits shifting of the lockout pin 112 so that the pin section 122 can be selectively removed from the opening 128 (e.g., for engaging the lockout pin 112 with the trip cam 64).

In the engaged position, the pin section 122 of the lockout pin 112 preferably extends through the slotted opening 102 (see FIG. 5) and into an opening 130 (see FIG. 6) in the upstanding wall 72a. Securement of the pin section 122 through the slotted opening 102 is operable to restrict or limit movement of the trip cam 64 out of the metering condition. When secured in the slotted opening 102, the lockout pin 112 and trip cam 64 are slidably interconnected such that the trip cam 64 is permitted to swing along the path P relative to the lockout pin 112 (while being retained in the metering condition) but prevented from shifting into the trip condition. In particular, with the lockout pin 112 slidably received in the slotted opening 102, relative movement between the trip cam 64 and lockout pin 112 along the path P is permitted, but the trip cam 64 is maintained in the metering condition.

The spring 114 preferably urges the pin section 122 of the lockout pin 112 through the slotted opening 102 and into the opening 130 when in the engaged position. However, the spring 114 also preferably permits shifting of the lockout pin 112 so that the pin section 122 can be selectively removed from the opening 130 (e.g., to remove the lockout pin 112 from the slotted opening 102 so that the lockout pin 112 can be secured in the disengaged position).

It is within the ambit of some aspects of the present invention for the lockout device to be alternatively configured for engagement with the trip cam or another part of the trip mechanism (e.g., to provide suitable lockout operation). As noted above, alternative embodiments of the lockout device may include an alternative structure for alternative shifting engagement with the trip cam. For instance, the lockout device could have an alternative complemental shape to engage the trip cam. Certain aspects of the present invention contemplate a lockout device defining an opening in which a portion of the trip cam is received.

In operation, the baler 20 is configured to form bales in the baling chamber 24 and bind each bale during a respective bale tie cycle. A new bale is formed, starting after the previous bale tie cycle, by adding severed crop material into the baling chamber 24. The drive wheel 78 is spun as crop material is advanced along the baling chamber 24, which produces corresponding upward movement of the trip cam 64 from the starting position toward the relief opening 108.

As the drive wheel 78 advances beyond the driven surface 104 into the relief opening 108, the trip cam 64 shifts from the metering condition to the trip condition. With the trip cam 64 shifted to the trip condition, the trip arm 66 is moved out of contact with the clutch 32 and permits engagement of the clutch 32 to start a bale tie cycle.

Once the bale tie cycle is initiated, the needles 52 are shiftable upwardly into the baling chamber 24 during an advancement stroke of the bale tie cycle to advance strands of twine upwardly along an end of the bale. The needles 52 are then shiftable downwardly out of the baling chamber 24 during a return stroke of the bale tie cycle to permit formation of the next bale. During normal baling operations, the lockout device 67 is shifted out of the lockout condition.

To restrict the baler 20 from performing a bale tie cycle, the lockout device 67 may be selectively moved into the lockout condition, which is preferable for facilitating baler maintenance. In the lockout condition, the lockout device 67 preferably engages the trip cam 64 to restrict movement into the trip condition. In particular, the pin section 122 of the lockout pin 112 is positioned to extend through the slotted opening 102 (see FIG. 5) and into an opening 130 (see FIG. 6) in the upstanding wall 72a. With respect to the illustrated embodiment, the lockout device 67 assuredly prevents initiation of a bale tie cycle but allows flexibility as to when the needle assembly 30 is locked out. Preferably, the lockout device 67 can be engaged in the lockout condition at any point during baling prior to initiation of the bale tie cycle (i.e., at essentially any point within the metering condition of the trip cam 64).

In a similar manner, the lockout device 67 may be selectively moved out of the lockout condition to a disengaged position, so that the baler 20 is again configured for normal baling operation. In the disengaged position, the lockout device 67 is disengaged from the trip cam 64. Preferably, the pin section 122 of the lockout pin 112 is removably secured in the opening 128 in the upstanding wall 72a (see FIGS. 4 and 5).

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

The invention claimed is:

1. A baler for forming crop material into a bale, said baler comprising:
   a chassis presenting a baling chamber in which the bale is formed; and
   a bale binding mechanism configured to wrap twine around the bale, said bale binding mechanism including:
      a baling needle shiftable relative to the baling chamber, with the needle being shiftable to advance twine along an end of the bale;
      a drive shaft supported by the chassis to power the needle;
      a clutch shiftable between an engaged condition in which the clutch drivingly interconnects the drive shaft and the needle, and a disengaged condition in which the clutch prevents the drive shaft from driving the needle; and
      a trip mechanism including a trip cam, a drive wheel, and a lockout device;
      said trip cam being shiftable between a trip condition associated with engagement of the clutch and a metering condition associated with disengagement of the clutch;
      said drive wheel being operable to shift the trip cam when in the metering condition;
      said trip cam being shiftable from the metering condition to the trip condition to engage the clutch when the bale is formed to a desired size;
      said lockout device removably engaging the trip cam to restrict the metering cam from shifting into the trip condition;
      said trip cam presenting a cam opening that removably receives the lockout device for engagement therewith;
      said trip cam presenting a driven surface extending along the cam opening;
      said driven surface being engaged by the drive wheel in the metering condition,
      said drive wheel being disengaged from the driven surface when the trip cam is in the trip condition.

2. The baler as claimed in claim 1,
   said driven surface defining a path along which the trip cam is driven by the drive wheel while in the metering condition,
   said trip cam moving in a direction transverse to the path when shifting between the metering condition and the trip condition.

3. The baler as claimed in claim 2,
   said lockout device being shiftably engaged with the trip cam to restrict shifting movement of the trip cam relative to the lockout device along the path.

4. The baler as claimed in claim 2,
   said cam opening extending along the path,
   said lockout device including a lockout pin extending through the cam opening to restrict movement of the trip cam out of the metering condition and permit the trip cam to move along the path relative to the lockout pin.

5. The baler as claimed in claim 4,
   said trip cam presenting an offset surface that is at least partly offset from the driven surface along the transverse direction and spaced from the driven surface along the path,
   said offset surface defining a relief opening that at least partly receives the drive wheel in the trip condition.

6. The baler as claimed in claim 5,
   said cam opening being spaced from the relief opening.

7. The baler as claimed in claim 4,
   said lockout device including a spring that urges the lockout pin into engagement with the cam opening,
   said spring permitting the lockout pin to be shifted out of engagement with the cam opening.

8. The baler as claimed in claim 1,
   said drive wheel including a metering gear, said driven surface being toothed.

9. The baler as claimed in claim 8,
   said trip mechanism including a drive,
   said drive including the drive wheel, a powered wheel, and a shaft drivingly connecting the drive wheel and powered wheel,
   said drive wheel being driven by the powered wheel as the powered wheel is spun by a bale advancing along the baling chamber.

10. A baler for forming crop material into a bale, said baler comprising:
    a chassis presenting a baling chamber in which the bale is formed; and
    a bale binding mechanism configured to wrap twine around the bale, said bale binding mechanism including:
       a baling needle shiftable relative to the baling chamber, with the needle being shiftable to advance twine along an end of the bale;
       a drive shaft supported by the chassis to power the needle;
       a clutch shiftable between an engaged condition in which the clutch drivingly interconnects the drive shaft and the needle, and a disengaged condition in which the clutch prevents the drive shaft from driving the needle; and
       a trip mechanism including a trip cam, a drive wheel, and a lockout device;
       said trip cam being shiftable between a trip condition associated with engagement of the clutch and a metering condition associated with disengagement of the clutch;
       said drive wheel being operable to shift the trip cam when in the metering condition;
       said trip cam being shiftable from the metering condition to the trip condition to engage the clutch when the bale is formed to a desired size;
       said lockout device removably engaging the trip cam to restrict the metering cam from shifting into the trip condition;

said trip cam presenting a driven surface engaged by the drive wheel in the metering condition;

said drive wheel being disengaged from the driven surface when the trip cam is in the trip condition;

said driven surface defining a path along which the trip cam is driven by the drive wheel while in the metering condition;

said trip cam moving in a direction transverse to the path when shifting between the metering condition and the trip condition;

said lockout device being shiftably engaged with the trip cam to restrict shifting movement of the trip cam relative to the lockout device along the path.

11. The baler as claimed in claim 10, said trip cam presenting an offset surface that is at least partly offset from the driven surface along the transverse direction and spaced from the driven surface along the path, said offset surface defining a relief opening that at least partly receives the drive wheel in the trip condition.

12. The baler as claimed in claim 10, said drive wheel including a metering gear, said driven surface being toothed.

13. The baler as claimed in claim 12, said trip mechanism including a drive, said drive including the drive wheel and a powered wheel drivingly connected to one another, said drive wheel being driven by the powered wheel as the powered wheel is spun by a bale advancing along the baling chamber.

\* \* \* \* \*